(12) United States Patent
Nolan

(10) Patent No.: US 7,190,373 B1
(45) Date of Patent: Mar. 13, 2007

(54) ALPHA CHANNEL FILTER

(76) Inventor: Paul Anthony John Nolan, 3687 Mount Ariane Dr., San Diego, CA (US) 92111

( * ) Notice: Subject to any disclaimer, the term of this patent is extended or adjusted under 35 U.S.C. 154(b) by 755 days.

(21) Appl. No.: 09/802,963

(22) Filed: Mar. 12, 2001

Related U.S. Application Data

(60) Provisional application No. 60/188,249, filed on Mar. 10, 2000.

(51) Int. Cl.
G09G 5/02 (2006.01)

(52) U.S. Cl. .................... 345/592; 345/589

(58) Field of Classification Search ........... 345/156, 345/441, 589–592, 762, 442, 419–426; 358/500, 358/537–540; 382/163
See application file for complete search history.

(56) References Cited

U.S. PATENT DOCUMENTS

| | | | | |
|---|---|---|---|---|
| 5,182,548 A | * | 1/1993 | Haeberli | 345/639 |
| 5,231,504 A | * | 7/1993 | Magee | 358/500 |
| 5,307,452 A | * | 4/1994 | Hahn et al. | 345/592 |
| 5,412,767 A | * | 5/1995 | Long | 345/639 |
| 5,844,565 A | * | 12/1998 | Mizutani et al. | 345/581 |
| 5,977,981 A | * | 11/1999 | Brown | 345/581 |
| 5,999,190 A | * | 12/1999 | Sheasby et al. | 345/589 |
| 6,011,536 A | * | 1/2000 | Hertzmann et al. | 345/418 |
| 6,201,549 B1 | * | 3/2001 | Bronskill | 345/441 |
| 6,317,142 B1 | * | 11/2001 | Decoste et al. | 345/762 |
| 6,377,240 B1 | * | 4/2002 | Baudel et al. | 345/157 |
| 6,385,628 B1 | * | 5/2002 | Massarsky | 715/502 |
| 6,434,269 B1 | * | 8/2002 | Hamburg | 382/163 |

OTHER PUBLICATIONS

B. J. Meier, "Painterly Rendering for Animation", In SIGGRAPH 96 Conference Proceedings, pp. 477-484. ACM SIGGRAPH, Aug. 1996.*
M. A. Kowalski, et al., "Art-Based Rendering of Fur, Grass, and Trees", in SIGGRAPH 99 Conference Proceedings, pp. 433-438. ACM SIGGRAPH, Aug. 1999.*
M. Shiraishi, et al., "An Algorithm for Automatic Painterly Rendering Based on Local Source Image Approximation", In SIGGRAPH 2000 Conference Proceedings, pp. 53-58. ACM SIGGRAPH, Aug. 2000.*

* cited by examiner

*Primary Examiner*—Kee M. Tung
*Assistant Examiner*—Jin-Cheng Wang
(74) *Attorney, Agent, or Firm*—James Creighton Wray

(57) ABSTRACT

An image processing filter processes an image, and the resultant processed image is merged with an unprocessed version of the image using an alpha channel. The ability to modify the alpha channel based on user input is provided, and the image is reprocessed upon the alpha channel being modified. It is possible for image processing filters to be painted on to an image. The paint layer system takes into consideration how much paint has been applied to the pixel being processed. The simplest form of the invention, which can be expressed as ProcessedPixel=SourcePixel+AlphaPixel, results in each pixel in the image being brightened by an amount relative to the spatially equivalent alpha channel pixel.

5 Claims, 4 Drawing Sheets

ALPHA CHANNEL FILTER

BACKGROUND OF THE INVENTION

This application claims the benefit of U.S. Provisional Application No. 60/188,249, filed Mar. 10, 2000.

SUMMARY OF TERMS IN THE INVENTION

Pixel—Pixel stands for Picture Element. It is the smallest addressable unit of an image.

Image—A collection of pixels.

Primary Image—The image viewed by the user.

Undo Image—A copy of the primary image in a state prior to being processed

Paint Layer—An image (alpha channel) used to keep track of where the user has painted, that is attached to the Primary image. Each paint layer also has other information associated with it, such as the current color, transparency, and paint mode function.

Media—A representation of the tool that the user paints with, for example an airbrush, watercolor brush, pencil, chalk, fire, lensflare, or neon.

Media Image—A user selectable and modifiable image representing the currently selected media. Note that this image need not reside in storage, it can be represented algorithmically and calculated on the fly during the paint process.

Paint—What the user observes as something that they have done to modify an image.

Paint Mode—A user selectable image processing function (filter) of any complexity.

Alpha Channel—An image used to mask another image. Each pixel in the alpha channel represents the transparency of the spatially corresponding pixel(s) of the Image it is attached to. The brighter a pixel is in the Alpha Channel, the more the equivalent pixel in the Image it is attached to show through to the image below it. Conversely, if a pixel in the alpha channel is dark (i.e. has a value of close to zero), then a correspondingly less percentage of the equivalent pixel in the image will be visible.

BRIEF DESCRIPTION OF THE INVENTION

An image processing filter typically processes an image, and the resultant processed image is merged with an unprocessed version of the image using an alpha channel. If the ability to modify the alpha channel based on user input is provided, and the image reprocessed upon the alpha channel being modified, it is possible for image processing filters to be painted on to an image. In a typical situation, the image processing filter does not know about the alpha channel, and produces the same result no matter what transparency is eventually applied to it.

A typical filter generates its results based on the pixels it processes. This invention uses the paint layer system to take into consideration how much paint has been applied to the pixel being processed. This is innovative because prior image processing filters do not take into consideration the amount the effect is being applied when calculating the filter's result.

An apparatus for creating an emblazoning effect in a graphical image has a processor, a primary buffer for storing primary pixel values representing a region, and a secondary buffer for storing secondary pixel values representing a region. A user-modifiable alpha channel stores tertiary values for pixels representing the same region. A function represents both the application of color and of brightness values to input pixel values. The processor executes the function on the secondary pixel values to the extent represented by the tertiary pixel values held in the alpha channel. The resultant pixel values are stored as the primary pixel values, in the primary buffer. A user-activated means copies the primary pixel values stored in the primary buffer to the secondary pixel values stored in the secondary buffer.

Emblazoning effects are created in a graphical image by choosing a media image, causing edges of the media image to have less transparency, adding the media image to a paint layer, and brightening parts of the paint layer with the media image.

Effects are created in a processed graphic image by providing an image channel with a graphic image having source pixels, providing an alpha channel having alpha channel pixels which are spatially equivalent to the source pixels, assigning color values to the alpha channel pixels, brightening the color values assigned to alpha channel pixels, and causing edges of an image formed by the alpha channel pixels to have less transparency.

Causing edges of the media image to have less transparency is not a requirement. You could have the edges sharp and the interior smooth, and the filter would still work; it would just appear to build up slightly differently.

Effects in a graphic image are created by providing a source image channel having source pixels, providing a color level with selected colors, and providing an alpha channel with alpha channel pixels which are spatially equivalent to the source pixels.

These and further features of the invention are apparent in the disclosure, which includes the above and ongoing written specification, with the claims and the drawings.

BRIEF DESCRIPTION OF THE DRAWINGS

FIG. 3 is an example of the burn through filter described below.

DETAILED DESCRIPTION OF THE PREFERRED EMBODIMENTS

The simplest form of the invention can be expressed as ProcessedPixel=AlphaPixel. If this function were applied to every pixel in an image, the result would be similar to painting on white paint.

Another function is ProcessedPixel=SourcePixel+AlphaPixel. This would result in each pixel in the image being brightened by an amount relative to the spatially equivalent alpha channel pixel.

Figure 1:
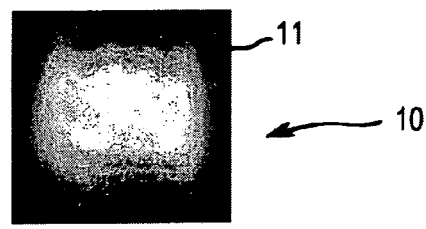
FIG. 1 is an example of a media image used to add values to the alpha channel when the user draws on the image.
Figure 2:
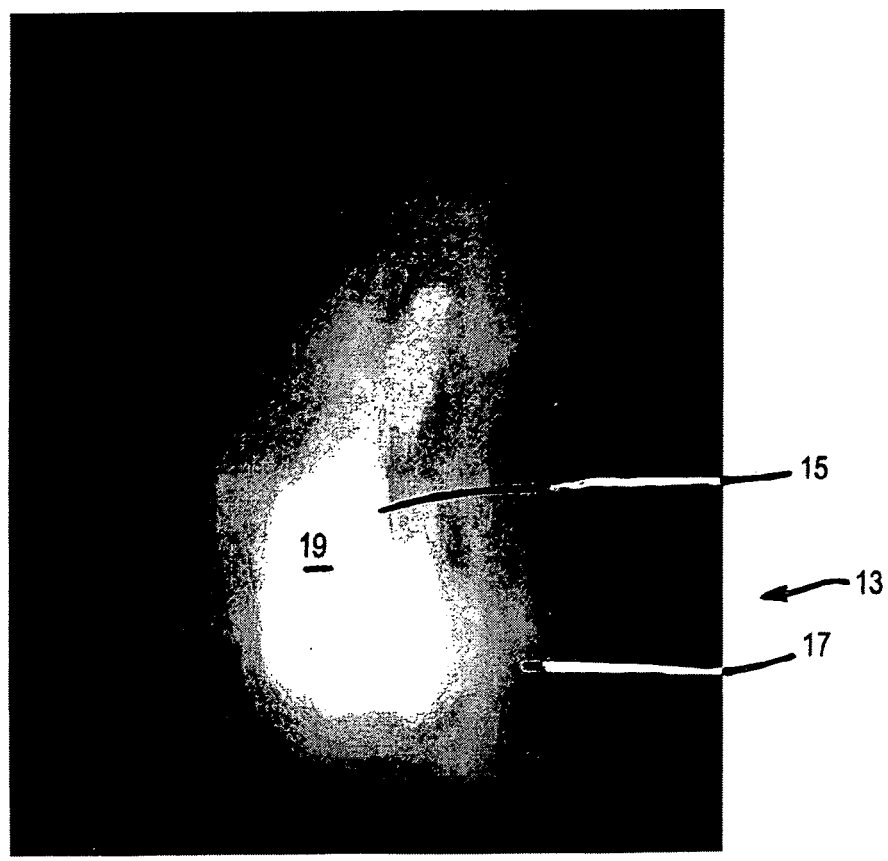
FIG. 2 is an example of the alpha channel drawn using the media image in FIG. 1.

A very useful function is ProcessedPixel=CurrentColor++ AlphaPixel. The result is that when the user starts to paint, the currently selected color is displayed, but as more and more paint is applied, the color is brightened. The media image 10 (FIG. 1) is chosen in such a way as to cause the edges 11 of the media to have less transparency, so that when added to the paint layer 13 (FIG. 2), certain parts 15 of the paint layer become brighter than others, creating a very pleasing effect 17 that looks like fire 19, as shown in FIG. 3.

The function that generates the fire effect works by taking the color value assigned to the alpha channel, and brightening it based on the value of the current paint layer value.

There are many ways of achieving the brightening, but a non-linear method gives more pleasing results.

Figure 3:
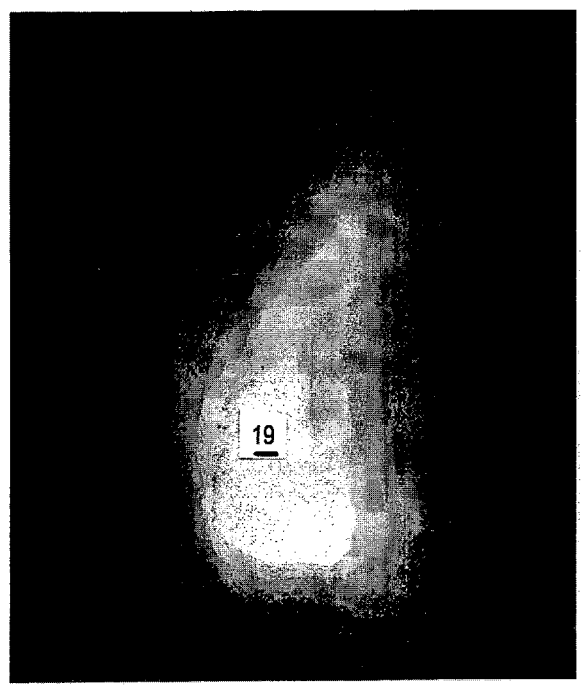
FIG. 3 is an example of the results of the fire filter described below.
Figure 4:
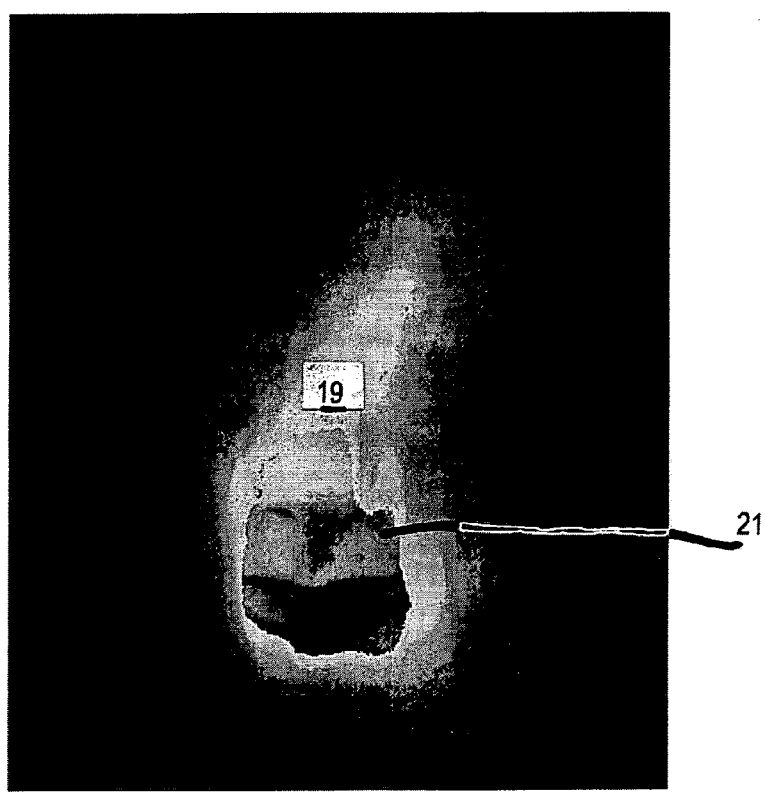
FIG. 4 uses the same alpha channel input values as in the previous figures, but embosses the alpha values.

The current implementation works as shown in FIG. 3 is as follows:

Brightness=AlphaChannel(x,y);
NewBrightness=Brightness$^2$
FirePixel(x,y)=UndoImage(x,y)+NewBrightness In the above implementation, a value representing white is returned if the alpha channel pixel is above a certain value. Instead of returning white, the spatially equivalent pixel of a secondary image (which could also be the primary image) could be returned, as shown in FIG. 4. This has the effect of fire 19 burning through to a second image 21. This pixel from a secondary image could be blended with the value computed in the method above dependant on how high the value of the alpha channel pixel is. This would have the effect of burning through to the secondary image more smoothly.

Figure 5:
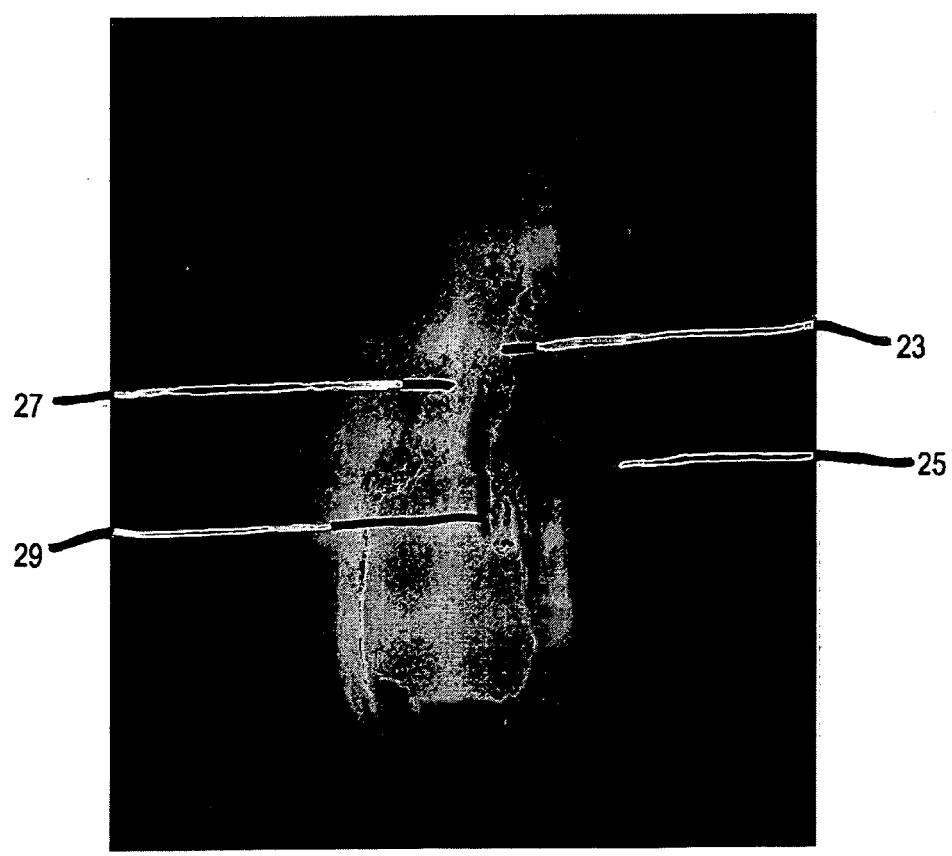
FIG. 5 shows results of an embossed alpha channel.

A further form of the invention is to perform a complex mapping of the alpha channel, and use this as an input in an equation. For example, the filter maps multiple pixels in the alpha channel to one resultant value in such a as way as to emboss the alpha channel. The result of the embossing 23 is used to affect the brightness of the current color being applied. It gives channel to one resultant value in such a way as to emboss the alpha channel. The result of the embossing 23 is used to affect the brightness of the current color being applied. It gives the effect of the paint 25 being applied having a sense of depth, due to the embossing giving the paint highlights 27 and shadows 29, as shown in FIG. 5.

I have invented a new class of image processing filters that use values from an alpha channel image when calculating the resultant processed image, as opposed to standard image processing filters that simply use values from the primary image to produce their result.

The invention need not be implemented in software, a hardware implementation is also possible.

While the invention has been described with reference to specific embodiments, modifications and variations of the invention may be constructed without departing from the scope of the invention, which is defined in the following claims.

I claim:

1. A method of creating effects in a processed graphic image, comprising providing an image channel with a graphic image having source pixels, providing an alpha channel having alpha channel pixels which are spatially equivalent to the source pixels, assigning a color value to the alpha channel pixels, brightening the color value assigned to alpha channel pixels, and causing edges of an image formed by the alpha channel pixels to have less transparency.

2. The method of claim 1, further comprising choosing a media image, causing edges of the media image to have less transparency, adding the media image to a paint layer, and brightening parts of the paint layer with the media image.

3. A method of creating effects in a graphic image, comprising providing a source image channel having source pixels, providing a color level with selected colors, providing an alpha channel with alpha channel pixels which are spatially equivalent to the source pixels, mapping multiple pixels in the alpha channel, embossing the pixels in the alpha channel and using a result of the embossing for changing brightness of the selected colors being applied, and providing highlights to the selected colors, thereby providing a sense of depth due to the embossing, giving the highlights to the applied colors.

4. The method of claim 3, further comprising choosing a media image, causing edges of the media image to have less transparency, adding the media image to a paint layer, and brightening parts of the paint layer with the media image.

5. A method for creating an emblazoning effect in a graphical image, comprising storing in a primary buffer of a processor primary pixel values representing a region, storing in a secondary buffer secondary pixel values representing the region, storing tertiary values for pixels representing the same region in a user-modifiable alpha channel, providing a function representing application of color and brightness values to pixel values, executing said function on the secondary pixel values to the extent represented by the tertiary pixel values held in an alpha channel, and storing resultant pixel values as the primary pixel values, in the primary buffer, copying the primary pixel values stored in the primary buffer to the secondary pixel values stored in the secondary buffer, providing an image channel with a graphic image having source pixels, providing in the alpha channel alpha channel pixels which are spatially equivalent to the source pixels, assigning color values to the alpha channel pixels, brightening the color values assigned to the alpha channel pixels, and causing edges of an image formed by the alpha channel pixels to have less transparency.

* * * * *